United States Patent [19]

Goldstone

[11] 4,035,215

[45] July 12, 1977

[54] PROCESS FOR MAKING SOUND INSULATION COMPONENTS

[75] Inventor: Edward G. Goldstone, Huntington Woods, Mich.

[73] Assignee: Allen Industries, Inc., Troy, Mich.

[21] Appl. No.: 673,737

[22] Filed: Apr. 5, 1976

[51] Int. Cl.² .................................... B32B 31/20
[52] U.S. Cl. .......................... 156/245; 156/220; 156/253; 181/33 GA; 264/122; 264/137; 296/39 A; 427/195; 428/156; 428/283; 428/288; 428/290
[58] Field of Search .......... 428/156, 283, 290, 288; 156/245, 209, 80, 253, 498, 220 X; 427/195, 119; 264/134, 122, 137; 181/33 GA; 296/39 A, 39 R

[56] References Cited

U.S. PATENT DOCUMENTS

| 3,343,975 | 9/1967 | Daneski et al. | 427/195 |
| 3,928,693 | 12/1975 | Rudloff | 264/122 |
| 3,975,483 | 8/1976 | Rudloff | 264/134 |

*Primary Examiner*—Edward G. Whitby
*Attorney, Agent, or Firm*—Harness, Dickey & Pierce

[57] ABSTRACT

A process for making composite contoured sound insulating panels of a type suitable for use adjacent to structural panels of automobile vehicle bodies, which in accordance with one embodiment of the present invention, comprises forming a fibrous pad incorporating controlled amounts of a heat curable thermosetting binder and a heat softenable thermoplastic binder distributed in a controlled manner therethrough. The pad is subjected to a preliminary curing step to bond the fibers together into an integral mass, whereafter a dense liquid vinyl plastisol coating is applied to at least one face surface of the pad, which thereafter is heated to effect a fusion of the coating into a heat softened integral layer, effecting a simultaneous heat softening of the thermoplastic binder, whereafter the heated pad is placed between appropriately contoured mold surfaces and is compressed to impart a preselected contour thereto and localized embossments therein and a desired surface finish to the plastisol layer, while simultaneously cooling the pad to effect a rigidification of the thermoplastic binder and the layer so as to retain the composite pad in the preselected contoured and embossed configuration. In accordance with an alternative embodiment of the disclosed process, the pad is subjected to a preliminary molding step followed by the coating step and is subjected to a final molding step after the plastisol coating has been fused at an elevated temperature.

21 Claims, 4 Drawing Figures

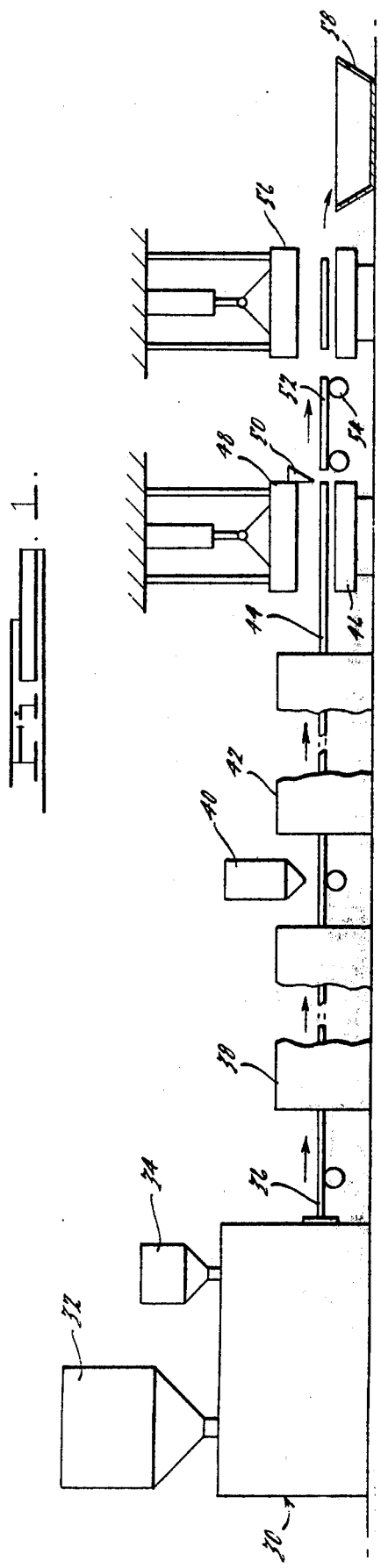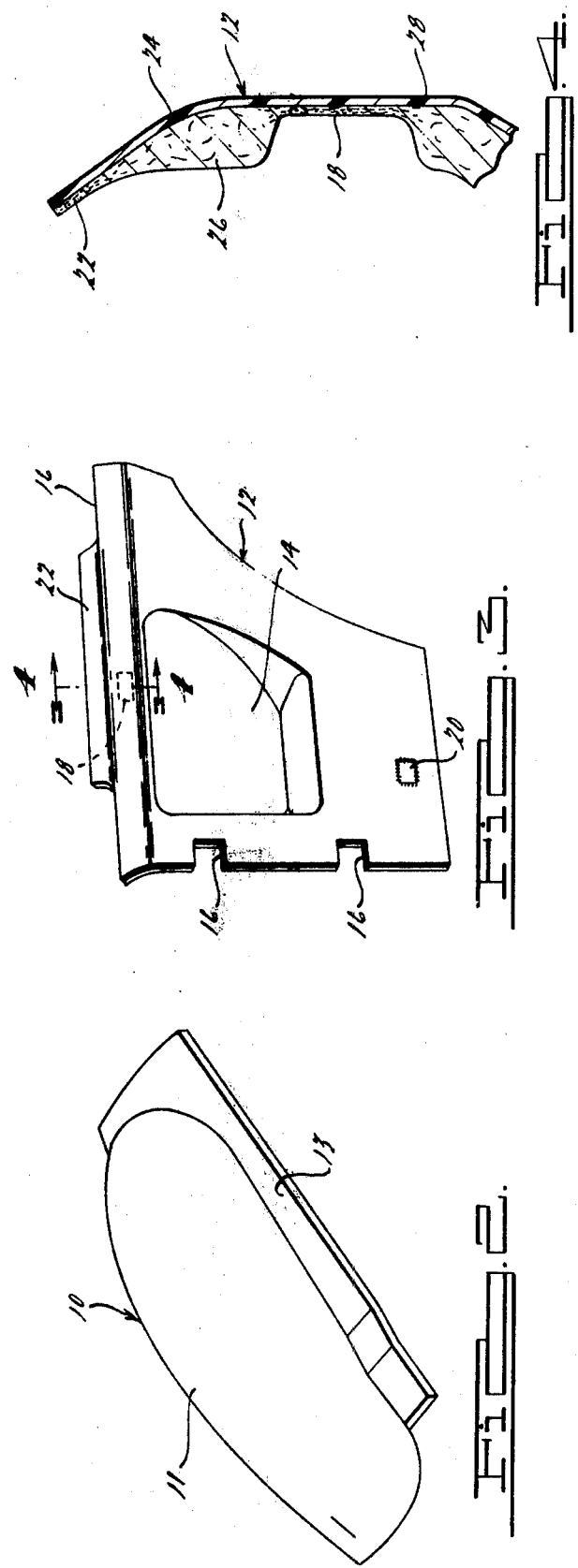

PROCESS FOR MAKING SOUND INSULATION COMPONENTS

BACKGROUND OF THE INVENTION

The process of the present invention is particularly applicable, but not necessarily restricted, to the production of sound insulating panels incorporating a preselected contoured and embossed configuration for use in the passenger compartments of automobile vehicles and the like. Composite sound insulating panels of the foregoing type are adapted to be disposed in overlying shape-conforming relationship against structural panels of vehicle bodies, providing for a significant reduction in the transmission of engine and road noise into the passenger compartment, over which a decorative trim panel or carpeting is applied. Typically, such sound insulating panels are applied over the floor pan, the toe board, the dash panel, the rear quarter panels, the trunk, under the hood and over the wheel housings of automobile bodies and must be accurately contoured and embossed to facilitate attachment to the supporting structural panel, such as by fasteners or adhesives, and to provide proper clearance for assembly of ancillary decorative panels and operating components.

Composite contoured sound insulating panels to which the present process is directed comprise a fibrous pad having a dense filled resinous coating applied substantially uniformly on at least one face surface thereof. Typical of the prior art processes heretofore employed in manufacturing such composite panels are those disclosed in U.S. Pat. Nos. 3,429,728 and 3,536,557. In accordance with the foregoing patented processes, fibrous panels are molded to impart a preselected shape-sustaining contour thereto, after which they are die-cut and subsequently are coated with a dense sound insulating substance, such as a highly filled asphaltic or bituminous base material. Considerable difficulty has been encountered in such prior art processes in achieving a uniform coating of the sound insulating material on the molded fibrous pad due to a puddling effect and a shading effect along substantially vertical and angular surfaces. The shading effect necessitates the use of excess coating material to assure attainment of minimum coating weights along such shaded areas.

The application of such hot melt or other high density coating materials has also occasioned some distortion of the molded fibrous pad, causing difficulties during installation and assembly operations of such composite sound insulating panels in vehicle bodies. The surface texture of the sound insulating coating applied in accordance with prior art practices also is somewhat irregular and has occasioned, at times, difficulty of achieving appropriate alignment and registration of the composite contoured panel and the structural components of vehicle bodies.

The present invention overcomes many of the problems and disadvantages associated with prior art practices by providing a process which provides for a more uniform coating of the dense sound insulating layer, achieving thereby improved performance and a conservation of raw material, which enables the application of a desired surface texture or finish to the dense insulating coating, and which provides for a more accurate contouring and embossment of the panel and improved definition of surface contours and embossed areas therein.

SUMMARY OF THE INVENTION

The benefits and advantages of the present invention are achieved in accordance with one of the embodiments of the disclosed process in which a fibrous pad is formed which is of substantially uniform thickness and density, and which is impregnated with a controlled amount of a heat curable thermosetting binder and a heat softenable thermoplastic binder, preferably in the form of a powder distributed in a controlled manner throughout the fibrous matrix. The fibrous pad is heated to an elevated temperature for a period of time sufficient to effect at least a partial curing of the thermosetting binder and a heat softening of the thermoplastic binder so as to fuse and coat the fibers at their points of contact, forming an integral porous fibrous pad which can be handled without tearing or delamination during the succeeding process steps. A liquid vinyl plastisol coating containing a particulated filler in an amount up to about 80% by weight is applied to at least one face surface of the pad at or about ambient temperature, and the resultant coated pad is thereafter heated at an elevated temperature usually ranging from about 350° F to about 450° F to effect a fusion of the plastisol into an integral heat softened flexible layer, while simultaneously effecting a heat softening of the thermoplastic binder and a final curing of the thermosetting binder. The resultant heated pad, with the thermoplastic binder and the plastisol layer still in a heat softened condition, is thereafter positioned between a pair of opposed contoured mold surfaces and is compressed therebetween to impart a preselected contour to the pad and a localized embossment of certain areas thereof, as well as the application of a desired surface finish to the fused plastisol layer. While in the mold, the pad is simultaneously cooled to a temperature at which a rigidification of the thermoplastic binder and plastisol layer occurs, whereby the composite pad is retained in the preselected contoured and embossed configuration.

In accordance with an alternative embodiment of the present invention, the fibrous pad after impregnation with a controlled amount of thermosetting and thermoplastic binder is subjected to a partial curing of the thermosetting binder to impart integrity to the pad, whereafter the pad is molded at an elevated temperature while in a compressed and contoured condition between a pair of mold surfaces to impart a preliminary preselected contour and embossed configuration thereto, which is retained in response to a further curing of the thermosetting binder. The preliminarily contoured pad thereafter is coated with the loaded vinyl plastisol, which subsequently is fused into an integral layer, and the preliminarily contoured and coated pad thereafter is subjected to a final molding step in which the pad is simultaneously cooled to effect a rigidification and shape retention of the thermoplastic resin binder and the plastisol layer.

In accordance with still another embodiment of the present invention, only a heat curable thermosetting binder is employed which is partially cured prior to the preliminary molding step and is substantially completely cured during the following fusion step of the vinyl plastisol coating. The final molding operation is performed such that the plastisol layer is cooled and rigidified to retain the final contoured and embossed configuration of the composite pad.

Further benefits and advantages of the present invention will become apparent upon a reading of the description of the preferred embodiments taken in conjunction with the accompanying drawings.

BRIEF DESCRIPTION OF THE DRAWING

FIG. 1 is a schematic side elevational view of the sequence of steps employed in manufacturing composite contoured sound insulating components in accordance with one embodiment of the present invention;

FIG. 2 is a perspective view of a molded composite sound insulating component adapted to be disposed over a structural wheelhouse panel of an automobile body;

FIG. 3 is a perspective view of a composite contoured sound insulating component adapted to be disposed adjacent to a rear quarter panel of an automobile vehicle body; and FIG. 4 is a fragmentary magnified transverse sectional view of the insulating panel shown in FIG. 3 and taken substantially along the line 4—4 thereof.

DESCRIPTION OF THE PREFERRED EMBODIMENTS

Referring now in detail to the drawing, composite contoured sound insulating panels or pads typical of those which can be satisfactorily produced in accordance with the practice of the present invention are illustrated in FIGS. 2 and 3. A composite sound insulating panel 10 is shown in FIG. 2, including a curved section 11, which is adapted to be disposed in contour conforming relationship over the wheelhouse panel of an automobile body, and a contoured flat section 13, which overlies the floor panel to reduce transmission of road noises into the interior of the passenger compartment. FIG. 3 shows a composite sound insulating panel 12 which is illustrative of alternative embossed and contoured configurations which can be satisfactorily produced in accordance with the practice of the present invention. The composite panel 12, as illustrated in FIG. 3, is of a type adapted to be disposed adjacent to the rear side quarter panel of automobile vehicle bodies and in shape conforming relationship relative to an interior decorative trim panel defining the interior of the passenger compartment. As shown, the composite sound insulating panel 12 is formed with a contoured depression 14 to accommodate an arm rest depression in a trim panel and is further formed with notched cut-out sections 12, which are conveniently die-cut in the formed panel. In addition, the composite panel 12 includes embossed sections indicated at 18, 20, as well as a longitudinally extending section 22, along the upper edge thereof, which is of reduced thickness to provide the required clearance for assembly and installation of the composite pad in automobile vehicle bodies.

The longitudinally extending section 22 and embossed section 18 is more clearly shown in the magnified sectional view comprising FIG. 4 of the drawing. As shown, the composite embossed pad 12 comprises a dense insulating coating or layer 24 of substantially uniform thickness applied to at least one face of a fibrous pad 26, which may be of uniform thickness and density and may also contain localized selected embossments, such as the embossed sections 18 and 22, for any one of a variety of reasons. As will be noted, the fibrous pad 26 in the localized embossed sections is of an increased density as a result of the compaction of the fibrous structure to achieve the desired reduced thickness, whereby the fibrous structure may assume densities approaching 100% of theoretical density. The insulating layer 24 is of substantially uniform thickness over the entire area of the panel, including the embossed sections, and may also be provided with controlled variations in thickness as may be desired. The exterior surface of the insulating layer 24, as indicated in FIGS. 3 and 4, can be provided with any desired surface finish or texture to achieve optimum performance of the composite panel and to further facilitate its installation and fastening to adjacent structural and trim panels.

The fibrous pad portion of the composite sound insulating panel is comprised of a mass of randomly arranged fibers of any one or mixtures of the types well known in the art, including those of animal, vegetable and synthetic origin. In accordance with the practice of the present invention, fibers are selected which are of a length and strength and possessed of inherent flexibility to enable the formation of a fibrous network which is porous and possesses some resiliency. The mechanical properties of the fibers preferably are such to enable them to be passed through a garnetting or carding machine to effect a combing and random orientation thereof into an elongated fibrous blanket or batt without encountering any substantial degree of breakage or disintegration of the fiber filaments. Fibers which possess mechanical properties of the foregoing type include naturally-occurring vegetable origin fibers such as cotton, hemp, jute, ramie, sisal, cellulose, abaca and the like. Typical naturally-occurring animal origin fibers include wool, silk, hair from cattle, horses and hogs, chicken feathers, etc.; while fibers of a synthetic origin include cellulose acetate, viscose rayon, nylon, vinyl chloride, protein base fibers such as casein and soybean; glass fibers and the like. In addition to the foregoing mechanical properties, the fibers also should have a resistance to thermal degradation at the elevated temperatures to which the pad is exposed during the curing and plastisol fusion steps.

The formation of a substantially uniform fibrous blanket or batt of the desired thickness is achieved in accordance with any of the well known techniques such as, for example, by passing fibers through a suitable garnetting or carding machine forming a web which passes through a suitable lapper in which an overlapping of the web is performed until a batt of the desired thickness is obtained. The particular thickness and density of the fibrous batt can be varied over a broad range consistent with the intended end use of the composite insulating panel. Conventionally, fibrous blankets of a thickness of from about one inch to about three inches and of a density of from about one to about six ounces per square foot are prepared in the lapper which subsequently are compressed and at least partially cured to form an integrated matrix enabling further handling of the fibrous mass without delamination and/or tearing.

During the formation of the fibrous blanket in the lapper apparatus, a suitable binding agent in a finely particulated or powder form is introduced to effect a substantially uniform impregnation of the fibrous matrix. Binder concentrations ranging from as low as about 10% up to about 45% by weight based on the total weight of the fibrous blanket can be satisfactorily employed, with the higher concentrations providing for greater rigidity of the resultant molded and contoured pad. Particularly satisfactory results are obtained when the binder constituent is controlled within a range of about 25% up to about 35% by weight of the fibrous blanket.

The particular resinous binder employed can be varied somewhat, with the preferred binder comprising a controlled mixture of a thermoplastic resin in combination with a thermosetting resin. In accordance with one practice of the process of the present invention, the thermoplastic resin is employed in an amount ranging from about 15% to about 95%, preferably about 50% up to about 75%, of the total binder content, with the balance comprising thermosetting resin in an amount sufficient to integrally bond the fibrous matrix together and to retain its integrity in spite of being heated to elevated temperatures preliminary to the molding operation. It is also contemplated in accordance with alternative practices of the present invention that the thermosetting binder constituent can be employed in an amount up to 100%, with concentrations of from about 50% to about 75% thermosetting binder being preferred.

The thermosetting binder may comprise any one of a variety of thermosetting type resins including phenol aldehyde resins, urea resins, melamine resins or the like, of which the condensation product of phenol with formaldehyde constitutes a preferred material. In addition to the foregoing synthetic resins, various lattices, either of natural or synthetic rubber, as well as synthetic resin lattices such as urethane, or the like, can also be satisfactorily employed. In the latter event, the lattices are spray-applied to the fibrous web as it emerges from the garnetting machine and passing into the lapper.

The thermoplastic resin, on the other hand, may comprise any one of a variety of thermoplastic heat softenable resins which are compatible with the fibrous structure and have a heat softening range of from about 220° F to about 400° F, and preferably from about 250° F to about 300° F. Thermoplastic resins suitable for this purpose include polyethylene, polystyrene, polypropylene, acrylic, polyvinyl acetate, polyvinyl chloride resins, polyvinyl copolymers, and the like, of which polyvinyl chloride constitutes a preferred material. A particularly satisfactory polyvinyl resin in powder form is commercially available from Union Carbide Corporation under the designation VYHH, which comprises a copolymer of vinyl acetate and vinyl chloride.

The thermoplastic resin powder, by itself or in admixture with the thermosetting resin binder, can be impregnated into the fibrous batt upon emergence from the garnetting machine during its passage into the lapper, whereby a uniform dusting of the web structure is effected to provide a substantially uniform impregnation.

After impregnation with binder, the fibrous blanket or batt emerges from the lapper and is passed through a curing oven in which the batt is compressed to a preselected thickness between a pair of moving pervious conveyors and is heated to an elevated temperature to effect at least a partial curing of the thermosetting binder present, as well as a heat softening of any thermoplastic resin binder present to effect a coating of the fibers at their points of contact, such that upon cooling thereof, a rigidification and bonding of the fibrous matrix into an integral pad is effected.

The dense insulating layer 24 of the pad shown in FIG. 4 comprises a fused highly-filled polyvinyl chloride plastisol containing from as little as about 30% to as high as about 80% by weight of a finely particulated filler. Polyvinyl chloride plastisols containing from about 70% to about 75% by weight filler are particularly satisfactory in accordance with the practice of the present process. The use of finely particulated fillers or extenders which are of relatively low cost provides economics in applying a coating of a desired weight per unit area and also serves to increase the density of the layer, increasing its ability to absorb sound. Suitable extender or low cost particulate filler materials include, for example, powdered slag, slate flour, fly ash, limestone, barium sulfate, or the like, of which barium sulfate constitutes a preferred filler.

The plastisol itself comprises a dispersion of a finely-divided polyvinyl resin in a plasticizer which may typically comprise about 100 parts resin and about 50 parts up to about 100 parts plasticizer, forming a liquid which can be applied in the form of a coating on one face of the fibrous pad, such as by roll, knife or spray coating or by a curtainous stream coater beneath which the pad passes. In addition to the extender filler, the liquid plastisol composition may further contain a pigment, suitable stabilizers, viscosity depressant, and a controlled amount of organic solvent to adjust the viscosity of the solution to within a desired range. The molecular weight of the polyvinyl chloride resin particles in the plastisol composition are such so as to provide a fusion of the resin particles and plasticizers, forming an integral layer at temperatures which range from about 350° F up to about 450° F, with fusion temperatures of from about 375° F to about 425° F being particularly satisfactory. The fusion of the plastisol at temperatures in excess of about 450° F is generally undesirable due to the tendency of the plasticizer to volatilize, whereby the resultant sound insulation layer tends to lose its resiliency. The particular time and temperature relationship employed in any specific instance to effect a fusion of the plastisol coating into an integral layer will vary in consideration of the particular polyvinyl plastic particles employed, the type or types of plasticizers used, the thickness of the coating deposited on the pad and the quantity and type of other constituents incorporated in the plastisol formulation. It will be understood that during the fusion operation, the temperatures of the air surrounding the plastisol layer may exceed the permissible temperature range of about 350° F to about 450° F previously set forth, but the residence time of the coated pad in the fusion oven is controlled to avoid the coating itself from exceeding a maximum temperature of about 450° F.

The liquid plastisol coating composition is applied to at least one face of the fibrous pad while at a temperature ranging from ambient temperature up to as high as about 115° F. The coating is applied in amounts usually ranging from about five ounces up to about 30 ounces per square foot of pad surface, and usually is applied substantially uniformly thereover. A partial penetration of the plastisol coating into the surface of the fibrous pad, followed by subsequent fusion of the coating, effects a bonding of the fibrous substrate and the integral polyvinyl layer at the interface therebetween, forming an integral composite pad which possesses some resiliency and is of a preselected shape-retaining embossed and contoured configuration.

In accordance with a preferred embodiment of the present invention, the contoured composite sound insulating panel is produced in accordance with the sequence of operations as schematically illustrated in FIG. 1 of the drawing. As shown, a fibrous feed material is introduced into a carding or garnetting machine, indicated at 30, from an overhead hopper 32 in a manner to form a randomly oriented web which enters a lapper at the right-hand end of the garnetting machine 30, at which a suitable mixture of a thermoplastic and thermosetting binder in a hopper 34 containing from about 15% up to 95% thermoplastic constituent is uniformly impregnated in the fibrous blanket formed. The resultant impregnated fibrous blanket, indicated at 36, emerges from the formation apparatus and enters a curing oven 38 in which it is heated to an elevated temperature sufficient to effect at least a partial curing of the thermosetting binder constituent and a heat softening of the thermoplastic binder constituent to effect a bonding of the fibers together at their points of contact, forming an integral fibrous matrix.

Upon emergence from the curing oven 38, the cured blanket 36 passes beneath a coating device, indicated at 40, in which a filled liquid vinyl plastisol coating is discharged in the form of a substantially uniform curtain-like stream of a controlled thickness, providing a coating on the upper face of the fibrous blanket of the desired weight per unit area. The coated blanket thereafter enters a fusion oven 42 in which the coated blanket is heated to raise the temperature of the plastisol coating to within a range of about 350° F to about 450° F, effecting a fusion thereof and a bonding to the fibrous substrate. During the fusion step, a further curing of the thermosetting binder in the fibrous pad is effected while a heat softening of the thermosetting binder also occurs. The fused vinyl layer on the upper surface of the pad upon emergence from the fusion oven 42 also is in a heat softened condition.

The composite continuous blanket incorporating the heat softened dense insulating layer on the upper surface thereof, indicated at 44, upon emergence from the fusion oven passes into a molding station comprising a lower stationary mold, as schematically indicated at 46, and a vertically movable upper mold section 48, which are formed with appropriate mated contoured surfaces to effect a controlled compression and deformation of the composite blanket 44 to impart selected embossments and curvatures therein in a manner as previously described in connection with FIGS. 2-4. The mold halves 46, 48 are cooled so as to effect a cooling of the composite blanket from its entry temperature of about 350° F to about 450° F to a lower temperature while maintained in the compressed and deformed condition so as to effect a rigidification of the heat softened fused polyvinyl plastisol layer and the thermoplastic binding agent. The temperature of the mold surfaces preferably are maintained at about 40° F or lower, and this is achieved by transferring a suitable cooling fluid, such as a water ethylene glycol mixture, therethrough in a manner to extract the heat transferred to the mold by the preheated composite blanket.

The dwell period of the molded composite blanket in the cooling molds is controlled from about 10 to about 60 seconds, preferably about 20 to 30 seconds, which will vary depending upon the specific type of thermoplastic binder and plastisol layer employed. In any event, the dwell period is controlled to effect a sufficient cooling of the composite pad, such that the thermoplastic binder in the fibrous pad portion thereof sufficiently rigidifies to maintain the localized embossed fibrous portions in the preselected embossed configuration and to further retain the non-embossed fibrous portions thereof in the preselected contoured configuration. Additionally, at least a partial rigidification of the plastisol layer is effected, which also assists in maintaining the molded pad in the preselected contoured and embossed configuration.

The surface of the upper mold against which the hot plastisol layer is disposed may conveniently be provided with a surface texture or pattern to impart a corresponding texture or pattern to the outer surface of the fused plastisol layer during the cold molding operation. It is also preferred, in accordance with the arrangement illustrated in FIG. 1, that the upper mold section 48 include a cut-off knife, indicated at 50, to effect a simultaneous severing of the molded composite blanket during the closure of the molds.

The severed section, indicated at 52 in FIG. 1, is transferred by a conveyor 54 to a press 56 in which the blanked section is die-cut to provide an accurate peripheral shape, as well as to impart selected notches and apertures in the composite sound insulation panel. The resultant die-cut panel is transferred from the press 56 to a hopper 58 for storage and ultimate shipment.

It will be apparent from the process as hereinabove described in accordance with the sequence as schematically illustrated in FIG. 1, that the embossed and contoured shape-retaining configuration of the resultant composite panel is provided by the simultaneous rigidification of the thermoplastic binder and the fused plastisol layer, while the thermosetting binder imparts integrity to the fibrous pad during the processing thereof. The molding of the composite blanket while in a heated condition directly from the fusion oven provides for conservation of energy and provides improved moldability of the composite blanket, achieving more accurate embossed and contoured configurations therein. The application of the plastisol coating to the fibrous batt while in a flat condition also assures a more uniform application thereto without any tendency to puddle or shade angled surfaces, and the subsequent cold molding of the fused layer enables selected texturing or surface finishes to be imparted to the exterior plastisol layer.

The process sequence as previously described in connection with the arrangement shown in FIG. 1 can be modified such that the cured blanket 36 upon emergence from the curing oven 38 is die-cut into pads of the appropriate size, which thereafter are individually coated, such as by passage beneath the coating device 40, after which they are transferred to the fusion oven 42. The individual pads having the fused coating thereon, upon emergence from the fusion oven, are molded as before to final shape. This sequence of steps eliminates the final cutting and trimming steps required in the process as depicted in FIG. 1.

It is also contemplated in accordance with an alternative embodiment of the present invention that the fibrous blanket, upon impregnation with binder and a partial curing of a thermosetting binder constituent therein to impart integrity to the fibrous structure, is molded prior to coating into a preliminary shape-retaining configuration. In accordance with this alternative embodiment, the fibrous binder constituent preferably comprises from about 50% up to about 75% of a thermosetting binder in admixture with from about 50% to about 25% of a thermoplastic binder of the same types previously described. It is also contemplated, however, that the binder may be completely comprised of a thermosetting binder. A partial curing of the thermosetting binder constituent in the fibrous blanket prior to molding is performed to impart integrity to the pad to avoid tearing or delamination thereof. The partial curing can be achieved by applying heat to the opposed outer surfaces of the impregnated blanket, effecting some penetration into the interior of the pad, as well as by passing hot air through the pad to effect a partial curing throughout the thickness of the pad. In any event, the curing step is carried out so as to only effect a partial curing of the thermosetting binder, enabling a subsequent preliminary molding of the blanket or sections cut from the blanket into preliminarily contoured pads at an elevated temperature sufficient to effect a further and substantially complete curing of the thermosetting binder. The preliminary molding step is carried out employing heated mold sections between which the blanket is compressed and deformed, and the heating and curing of the thermosetting binder can be accelerated by passing hot air through the porous molded blanket to effect a bonding of the fibers in the deformed configuration, imparting a preliminary contoured and embossed configuration thereto.

The preliminarily molded pad thereafter is passed beneath a coating device, such as the device 40 shown in FIG. 1, while supported on a foraminous conveyor, whereby a controlled coating of a filled plastisol material is applied to at least one face surface thereof. The balance of the plastisol which is not deposited on the fibrous pad is recovered and recirculated. The coated contoured pad thereafter passes into the fusion oven in which a fusion of the plastisol coating into an integral layer is effected and a heat softening of any thermoplastic binding agent, if present, is also simultaneously effected. The resultant preliminarily molded pad incorporating a heat softened thermoplastic binder, if present, and an integral heat softened plastisol layer bonded thereto, is thereafter transferred to a cold molding operation, such as the lower and upper molds 46, 48 as shown in FIG. 1, in which it is remolded to a final shape and is simultaneously cooled to effect a rigidification of the plastisol layer, as well as any thermoplastic binder present in the fibrous pad portion thereof. When using a combination of both thermosetting and thermoplastic binder in accordance with this alternative embodiment, somewhat improved definition of localized embossed sections and a contouring of the fibrous pad portion is obtained in comparison to when employing only thermosetting binder alone, in which primary reliance of further contouring during the finish molding step is placed on the rigidification of the heat softened plastisol layer.

It will be appreciated in accordance with the alternative embodiment as hereinabove described, that the preliminary molding of the fibrous pad can be performed to apply an intermediate contoured and/or embossed configuration thereto, providing for angled and depressed sections so as to obtain desired localized variations in the quantity of liquid plastisol coating on the surface thereof. After subsequent fusion of the plastisol, the final or remolding operation imparts a new finish contour to the pad and further imparts a selected surface texture or finish to the plastisol layer. This embodiment also enables a preliminary molding of different specific panels employing an all-purpose or general mold and a final molding using a specialized mold of the precise configuration. The use of a general purpose mold for the preliminary molding stage substantially reduces the number of molds required to fabricate a variety of finished panels.

The preliminary molding of the semi-cured fibrous blanket in continuous roll form or in precut sections can be conveniently accomplished between heated mold halves, such as heated by hot oil or electric heaters, employing a phenolic type binder at temperatures ranging from about 400° F to about 600° F and, preferably, about 475° F to about 525° F. Hot air molding can also be employed utilizing temperatures of the foregoing magnitude to effect a substantially complete curing of the thermosetting binder and a retention of the preliminary embossed and contoured configuration.

It is also contemplated that contoured pads can be produced without having a plastisol layer on one or both surfaces thereof. This is achieved by forming a fibrous pad in the manner previously described incorporating a controlled mixture of a thermoplastic resin in combination with a thermosetting resin such that the thermoplastic resin is present in an amount of about 15% to 95% of the total binder present. The impregnated blanket is cured in the curing oven 38 and while the thermoplastic binder constituent is still in a heat softened condition, the blanket is directly molded such as by mold sections 46, 48 of FIG. 1. Alternatively, the blanket, upon emergence from the curing oven 38, is die-cut and the pads are reheated to effect a heat softening of the thermosplastic binder constituent and then are molded to the desired contour and are cooled to effect a rigidification of the thermoplastic binder while disposed between the mold surfaces.

While it will be apparent that the invention as herein described is well calculated to achieve the benefits and advantages hereinabove set forth, it will be appreciated that the invention is susceptible to modification, variation and change without departing from the spirit thereof.

What is claimed is:
1. A process for making a composite contoured and embossed sound insulating panel which comprises the steps of forming a fibrous pad of substantially uniform density and thickness and impregnated with a controlled amount of a heat curable thermosetting binder and a heat softenable thermoplastic binder distributed therethrough, heating the impregnated said pad to an elevated temperature for a period of time sufficient to effect at least a partial curing of said thermosetting binder and a heat softening of said thermoplastic binder to bond the fibers of said pad together into an integral mass, applying a dense liquid vinyl plastisol coating to at least one face surface of said pad, heating the coated said pad to an elevated temperature for a period of time sufficient to effect a fusion of said coating into an integral heat softened layer and a further curing of said thermosetting binder and a heat softening of said thermoplastic binder, positioning the heated said pad with said layer and said thermoplastic binder in a heat softened condition between contoured mold surfaces, cooling said contoured mold surfaces to a temperature below that at which a rigidification of said layer and said thermoplastic binder occurs, partially compressing said pad between said mold surfaces to impart a preselected contour thereto and localized embossments therein and to apply a desired surface finish to said layer and simultaneously cooling said pad to effect a rigidification of said thermoplastic binder and said layer to retain the composite pad in said preselected contour incorporating said localized emboss- ments therein, and thereafter extracting the cooled rigidified shape-retaining said composite pad.

2. The process as defined in claim 1, in which the step of forming said pad is performed such that the controlled amount of thermosetting and thermoplastic binder ranges from about 10% to about 45% by weight.

3. The process as defined in claim 1, in which the step of forming said pad is performed so that the controlled amount of thermosetting and thermoplastic binder ranges from about 25% to about 35% by weight.

4. The process as defined in claim 1, in which said thermoplastic binder is controlled within a range of about 15% to about 95% of the total amount of said binder.

5. The process as defined in claim 1, in which said thermoplastic binder is characterized as having a heat softening temperature of about 220° F to about 400° F.

6. The process as defined in claim 1, in which said thermoplastic binder is characterized as having a heat softening temperature ranging from about 250° F to about 300° F.

7. The process as defined in claim 1, in which said thermoplastic binder comprises a copolymer of vinyl acetate and vinyl chloride and said thermosetting binder comprises a phenolic resin, said thermoplastic binder being present in an amount of about 50% to about 75% of the total binder present.

8. The process as defined in claim 1, in which the step of heating the coated said pad to effect a fusion of said coating is performed at an elevated temperature of about 350° F to about 450° F.

9. The process as defined in claim 1, in which the step of applying a dense liquid vinyl plastisol coating to at least one face surface of said pad is performed in a manner to deposit from about 5 to about 30 ounces per square foot.

10. The process as defined in claim 1, in which the step of simultaneously cooling said pad to effect a rigidification thereof is performed with said mold surfaces at a temperature of less than about 40° F for a period of time of about 10 seconds to about 60 seconds.

11. A process for making a composite contoured and embossed sound insulating panel which comprises the steps of forming a fibrous pad of substantially uniform density and thickness and impregnated with a controlled amount of a heat curable thermosetting binder and a heat softenable thermoplastic binder distributed therethrough, heating the impregnated said pad to an elevated temperature for a period of time sufficient to effect a partial curing of said thermosetting binder and a heat softening of said thermoplastic binder to bond the fibers of said pad into an integral mass, positioning and compressing said pad between contoured mold surfaces to impart a preselected preliminary contour thereto and localized embossments therein and simultaneously heating said pad to effect a substantially complete curing of said thermosetting binder to retain said pad in the preliminarily contoured and embossed configuration, extracting said pad and applying a dense liquid vinyl plastisol coating to at least one face surface of the preliminarily contoured said pad, heating the coated said pad to an elevated temperature for a period of time sufficient to effect a fusion of said coating into an integral heat softened layer and a heat softening of said thermoplastic binder, positioning the heated said pad with said layer and said thermoplastic binder in a heat softened condition between second contoured mold surfaces, compressing said pad between said second mold surfaces to impart a preselected final contoured and embossed shape thereto and to apply a desired surface finish to said layer and simultaneously cooling said pad to effect a rigidification of said thermoplastic binder and said layer to retain the composite pad in said preselected final shape, and thereafter extracting the cooled rigidified shape-retaining said composite pad.

12. The process as defined in claim 11, in which the step of forming said pad is performed to provide a controlled amount of said thermosetting binder and said thermoplastic binder ranging from about 10% to about 45% by weight.

13. The process as defined in claim 11, in which said thermosetting binder comprises from about 50% to about 75% by weight of the total binder present.

14. The process as defined in claim 11, in which the step of heating the coated said pad to effect a fusion of said coating is performed at an elevated temperature ranging from about 350° F to about 450° F.

15. A process for making a composite contoured and embossed sound insulating panel which comprises the steps of forming a fibrous pad of substantially uniform density and thickness and impregnated with a controlled amount of a heat curable thermosetting binder distributed therethrough, heating said pad to an elevated temperature for a period of time sufficient to effect only a partial curing of said binder to partially bond the fibers of said pad into an integral mass, positioning and compressing said pad between contoured mold surfaces to impart a preselected preliminary contour thereto and localized embossments therein and simultaneously heating said pad to an elevated temperature to effect a substantially complete curing of said binder to retain said pad in the preliminary contoured and embossed said configuration, extracting said pad and applying a dense liquid vinyl plastisol coating to at least one face surface of the preliminary contoured said pad, heating the coated said pad to an elevated temperature to effect a fusion of said coating into an integral heat softened layer, positioning the heated said pad with said layer in a heat softened condition between second contoured mold surfaces, compressing said pad between said second mold surfaces to impart a preselected final contoured and embossed shape thereto and to apply a desired surface finish to said layer and simultaneously cooling said pad to effect a rigidification of said layer to retain the composite pad in said shape, and thereafter extracting the cooled, rigidified shape-retaining said pad.

16. The process as defined in claim 15, in which the step of positioning and compressing said pad between contoured mold surfaces to impart a preselected preliminary contour thereto is performed at an elevated temperature ranging from about 400° F to about 600° F.

17. The process as defined in claim 15, in which the step of forming said fibrous pad is performed such that the controlled amount of thermosetting binder ranges from about 10% to about 45% by weight of said pad.

18. The process as defined in claim 15, in which the step of heating the coated said pad to an elevated said temperature to effect a fusion of said coating is performed at a temperature ranging from about 350° F to about 450° F.

19. A process for making a contoured and embossed fibrous insulating panel which comprises the steps of forming a fibrous pad of substantially uniform density and thickness and impregnated with a controlled amount of a heat curable thermosetting binder and a heat softenable thermoplastic binder distributed therethrough, heating the impregnated said pad to an elevated temperature for a period of time sufficient to effect at least a partial curing of said thermosetting binder and a heat softening of said thermoplastic binder to bond the fibers of said pad together into an integral mass, positioning the heated said pad with said thermoplastic binder in a heat-softened condition between contoured mold surfaces, cooling said contoured mold surfaces to a temperature below that at which a rigidification of said thermoplastic binder occurs, partially compressing said pad between said mold surfaces to impart a preselected contour thereto and localized embossments therein and simultaneously cooling said pad to effect a rigidification of said thermoplastic binder to retain said pad in said preselected contour incorporating said localized embossments therein, and thereafter extracting the cooled rigidified shape-retaining pad.

20. The process as defined in claim 19, in which the step of forming said pad is performed to provide a controlled amount of said thermosetting binder and said thermoplastic binder ranging from about 10% to about 45% by weight.

21. The process as defined in claim 19, in which said thermoplastic binder comprises from about 15% to 95% by weight of the total binder present.

* * * * *